(12) United States Patent
Samper et al.

(10) Patent No.: US 8,753,587 B2
(45) Date of Patent: Jun. 17, 2014

(54) MICROVALVE

(75) Inventors: Victor Samper, Munich (DE); Christian Rensch, Munich (DE); Christoph Boeld, Munich (DE); Marko Baller, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/514,132

(22) PCT Filed: Dec. 30, 2010

(86) PCT No.: PCT/US2010/062453
§ 371 (c)(1),
(2), (4) Date: Jun. 6, 2012

(87) PCT Pub. No.: WO2011/082276
PCT Pub. Date: Jul. 7, 2011

(65) Prior Publication Data
US 2012/0267561 A1    Oct. 25, 2012

Related U.S. Application Data

(60) Provisional application No. 61/291,464, filed on Dec. 31, 2009.

(51) Int. Cl.
*B01D 21/00* (2006.01)
(52) U.S. Cl.
USPC ............ 422/527; 422/50; 422/417; 422/537; 251/129.14; 251/142; 251/150

(58) Field of Classification Search
USPC ............ 422/50, 500–503, 417, 537; 604/132; 251/129.14, 142, 150
See application file for complete search history.

(56) References Cited

U.S. PATENT DOCUMENTS

| | | | | |
|---|---|---|---|---|
| 5,776,103 A | * | 7/1998 | Kriesel et al. | 604/132 |
| 5,961,492 A | * | 10/1999 | Kriesel et al. | 604/132 |
| 6,406,605 B1 | | 6/2002 | Moles | |

FOREIGN PATENT DOCUMENTS

| | | |
|---|---|---|
| DE | 19949912 | 5/2001 |
| DE | 102006006706 | 8/2007 |

OTHER PUBLICATIONS

PCT/US2010/062453 ISRWO Dated Apr. 26, 2011.

* cited by examiner

*Primary Examiner* — Jyoti Nagpaul
(74) *Attorney, Agent, or Firm* — Robert F. Chisholm

(57) ABSTRACT

A microvalve assembly (10) includes an elongate valve body (14) having opposed first and second major surfaces, the first major surface defining a valve recess (34) and the second major surface defining first and second fluid ports (20,22). Both the fluid input port and the fluid output port extend in fluid communication with the valve recess. A gasket (12) is freely positioned within the valve recess so as to extend in overlying registry with either or both of fluid ports. A valve cover (16) is bonded to the valve body and includes a first planar surface positioned in overlying registry with the valve recess so as to enclose the gasket therein. The valve cover is deflectable into the valve recess so as to cause the gasket to seal at least one of the fluid ports.

16 Claims, 2 Drawing Sheets

MICROVALVE

This application is a filing under 35 U.S.C. 371 of international application number PCT/US2010/062453, filed Dec. 30, 2011, which claims priority to U.S. application No. 61/291,464 filed Dec. 31, 2009, the entire disclosure of which is hereby incorporated by reference.

FIELD OF THE INVENTION

The present invention is related to the field of microfluidics. More specifically, the present invention is directed to a microfluidic valve.

BACKGROUND OF THE INVENTION

There are many variations of membrane valves. Classical microfluidic membrane valves use either a hard-hard seal with very smooth micromachined surfaces, or incorporate a complete additional layer of a soft material between two hard layers. In all cases a good valve seal under practical situations relies on a hard material in contact with a soft material, or a soft material in contact with a soft material. Microfluidic devices are fabricated from polymers for high volume manufacturing, utilize injection moldable materials, and offer the advantage of high levels of integration. One challenge resulting from microfluidic devices fabricated in this way is that the devices are constructed from layers that are finally bonded together. The choice of materials is limited by both the final intended application and available manufacturing techniques. Examples of factors to consider are the application process chemicals and temperatures, and the fabrication processes such as molding and bonding. Satisfying the material requirements of a membrane valve at the same time as all other components that are intended to be part of the monolithic final device, without working with dissimilar materials that are difficult to join, can result in a valve that has a hard membrane pressing against a hard substrate.

The work of Jerman ("Electrically-activated, normally-closed diaphragm valves", J. Micromachining and Micrengineering, V4, 1994 pp 210-216), describes a silicon-on-silicon micromachined valve. Smooth surfaces resulted in leakage rates (on:off flow rates) of 5000:1.

The work of Bruns (Silicon Micromachining and High-speed gas chromatography, Proceedings of the 1992 International Conference on Industrial Electronics, Control, Instrumentation and Automation, 1992, V3, pp 1640-1644) describes a trapped polymer membrane between a glass membrane and a silicon valve body, to replace the hard-hard valve seal with a hard-soft valve seal.

The recent work of Chen et al (Floating-Disk Parylene Microvalves for Self-Pressure-Regulating Flow Controls, Journal Of Microelectromechanical Systems, Vol. 17, No. 6, December 2008), describes a silicon and parylene valve structure that consists of a floating parylene disc. The work in the paper aims to produce a passive valve with self-regulating behavior resulting from the movement of the floating parylene disc.

There is thus a need for a microvalve having a simple design which provides ease of manufacture and satisfactory performance. More specifically, there is therefore a need for a microvalve formed from bonding similar materials together for the fabrication of the microvalve, while simultaneously introducing a soft layer for valve sealing.

DETAILED DESCRIPTION OF THE INVENTION

Figure 1:
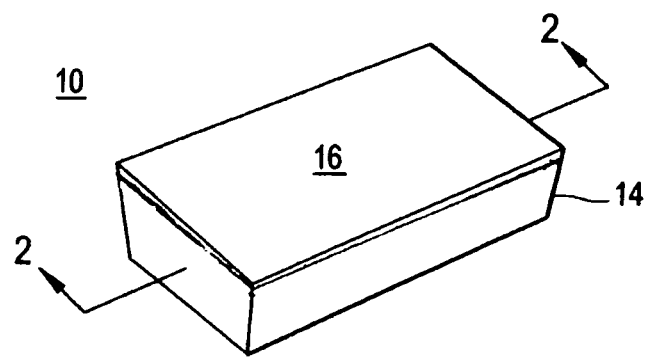
FIG. 1 depicts a microvalve of the instant invention.

The present invention describes the assembly of a soft material disc into a valve that otherwise consists of hard-on-hard materials. Without introducing an additional soft material into a hard-hard system, it is difficult to form a good valve seal without applying extremely high forces which jeopardize the reliability of the valve.

One alternative to assembling a floating disc is to bond the disc to the valve membrane. The complications in bonding the membrane are that the adhesive used for bonding or the choice of materials that are capable of being joined without adhesives, must be compatible with the application process. Early work on the membrane valve showed that a soft polypropylene (PP) layer 20 µm thick, bonded to a COC film 190 µm thick, produced a good seal to a PEEK valve body. The configuration was capable of sealing gas or water up to 6 bar gage pressure with a force less than 20 Newton applied to a valve seat approximately 1 mm in diameter and 40-100 µm wide. Unfortunately the PP layer bonded to the COC film prevented the COC film from bonding to a COC valve body without the use of an adhesive. Furthermore, removal of the PP from the COC film in all areas except the valve seat or alternatively the entire valve, exposed the COC-PP bonding adhesive on the edge to the fluid being directed through the valve, leading to potential chemical attack of the adhesive. Attempts to form an equivalent valve from a COC film without the bonded PP layer showed that the COC membrane could be successfully bonded to the COC valve body without an adhesive, however the resulting valve consistently suffered from leakage.

Another option is to use 2 K (two compound) molding to fabricate the valve body, where the valve seat is produced from a soft material. While satisfying the criteria for a good valve seal, this path is more costly and again restrictive in the choice of materials.

The present invention describes a solution for designing and producing a structure consisting of layers that can be bonded together, and may consist of hard-hard material combinations, while still satisfying the condition of a hard-soft material combination for valve sealing. This freedom in the valve design leads to many technical and commercial advantages. Technically, it provides a new degree of freedom in selecting the appropriate materials for the overall device, such as thermal performance or chemical stability, independently and free from concerns of satisfying the hard-soft requirement for a good valve seal. Commercially, the degree of freedom allows the device to be produced from layers of similar, or even the same material, reducing the complexity and cost of manufacturing. It also allows the same design to be produced in different families of materials for different applications, without the need for lengthy solutions to completely redesign the valve.

The invention works by inserting a thin disc of a soft gasket material between a valve body and a valve membrane, or valve cover, prior to bonding the valve membrane to the valve body. The thin disc could be of a material such as Teflon. A thickness in the range of 5 µm to 1 mm is possible since the thin disc is not bonded to the valve membrane and for this reason it does not affect the force-deflection performance of the valve membrane.

With reference to FIGS. 1-4, the present invention provides a microvalve 10. Microvalve 10 includes a soft floating gasket 12, assembled between a valve body, or substrate, 14 and a deformable membrane, or cover, 16, prior to bonding of membrane 16 to valve body 14. Valve body 14 and valve cover 16 may be formed, for purposes of illustration and not of limitation, from COC (cyclic olefin copolymer). Floating gasket 12 is made from a soft material, such as Teflon®, that eliminates the hard-on-hard surface when the valve is in a 'closed' configuration and relaxes the constraints on the selection of fabrication materials. Valve body 14 and cover 16 define a valve recess 18 therebetween, in which gasket 12 is positioned. Additionally, valve body 14 defines a first fluid port 20 and a second fluid port 22, both ports 20 and 22 in fluid communication with valve recess 18. Valve body 14 defines an inlet aperture 24 and an elongate inlet passage 26 extending in open fluid communication between first port 20 and inlet aperture 24. Valve body 14 further defines an outlet aperture 28 and an elongate outlet passage 30 extending in open fluid communication between second port 22 and outlet aperture 28. Valve 10 may thus be connected to two fluidically-isolated fluid conduits (or channels) at apertures 24 and 28 to regulate the flow therethrough.

Valve body 14 desirably includes a planar major surface 32 which defines a recess aperture 34 over which cover 16 spans so as to define valve recess 18 between valve body 14 and cover 16. Valve body 14 desirably includes an annular rim 36 recessed from major surface 32 and extending between coaxial cylindrical surfaces 38 and 40. Gasket 12 desirably is in the shape of a circular disc that that is at least partially co-extensive with annular rim 36 so that gasket 12 is perimetrically bounded between cover 16 and annular rim 36. The present invention further contemplates that gasket 12 is sized to span across valve recess 18 such that it also extends at least half or more of the width of rim 36 (that is, the perimetrical edge of gasket 12 desirably extends half-way or more between surfaces 38 and 40). Further still, the present invention contemplates that gasket 12 is sized and shaped to substantially span across recess aperture 34 so as to be substantially co-extensive with rim 36.

Valve body 14 further includes a substantially planar annular floor surface 42 in facing opposition to cover 16. Floor surface 42 defines first port 20. Valve body 14 further includes a valve seat 44 which defines second port 22 and assists in seating the foil gasket. Valve seat 44 extends further into valve recess 18 (i.e, closer to cover 16) than floor surface 42. Valve seat 44 includes a first portion 46 immediately about second port 22 and a second portion 48 sloping towards floor surface 42 so as to be non-transversely-oriented with the longitudinal axis of second port 22. Valve port 22 is desirably co-axially aligned with valve recess 18 so as to be centrally located under cover 16, thus the portion of cover 16 which is maximally deflected will press gasket 12 against valve seat 44 and thus fluidically isolate fluid port 22 when valve 10 is in a 'closed' orientation.

Figure 2:
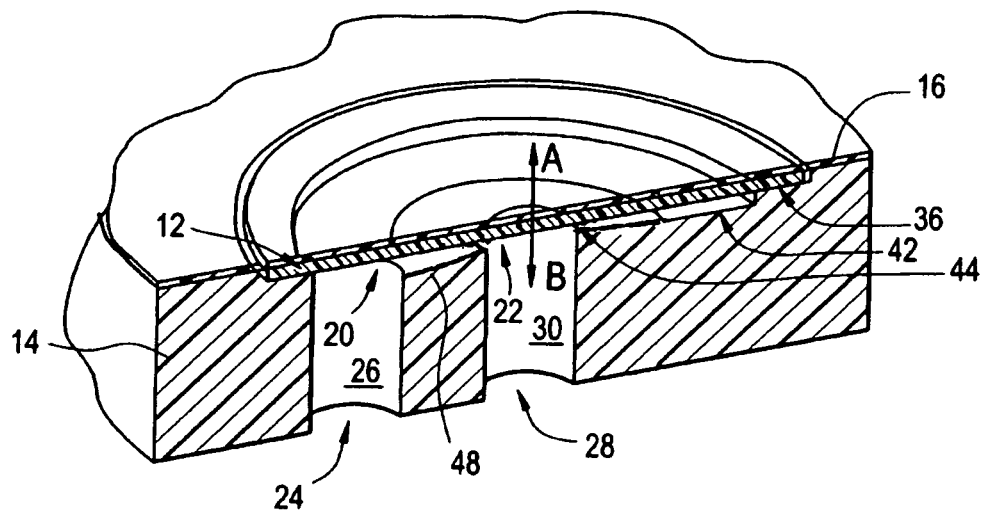
FIG. 2 depicts a cross-sectional view of the microvalve of FIG. 1, taken through the line 2-2.
Figure 3:
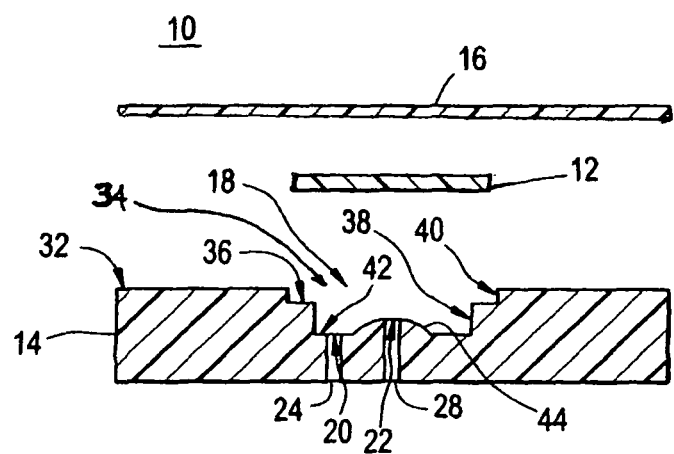
FIG. 3 depicts an exploded view of a microvalve of the present invention.

Arrows A and B in FIG. 2 depict the deflection of the valve cover 16 and gasket 12 both towards and away from a position where gasket 12 is in sealing registry with second fluid port 22. When the gasket is in the undeflected position, first fluid port 20 is in fluid communication with second fluid port 22, allowing a fluid flow therebetween through valve 10. When gasket 12 is in the deflected position, the gasket seals second fluid port 22 from first fluid port 20 and prevents flow therebetween through valve 10. The choice and dimension of the material used for valve cover 16 may be dictated by the dimensions of valve 10. The material used will allow gasket 12 to be deflected in accordance with the present invention.

As shown, gasket 12 sits in recess 18. Gasket 12 may be floating, however the present invention desirably provides gasket 12 loosely pinned in place between rim 36 and cover 16 as 1) it spans the valve recess and 2) it is pressed against the annular shelf of the valve body by COC membrane 16 at its perimeter. For these reasons gasket 12 offers the advantages of being attached to valve membrane 16, being positioned precisely over valve seat 44, not introducing significant additional dead volume in recess 18, and not affecting the elastic deformation behavior of valve membrane 16.

Additionally, annular valve seat 44 is desirably formed as a sloping surface extending up to second fluid port 22. The sloping surface rises from first fluid port 20 which opens adjacent to second fluid port 22. Desirably, both fluid ports 20 and 22 open in facing opposition to gasket 12, however the present invention contemplates that first fluid port 20 may be located anywhere which will be in fluid communication with the second fluid port when gasket 12 is undeflected (i.e, spaced from valve seat 44).

Figure 4:
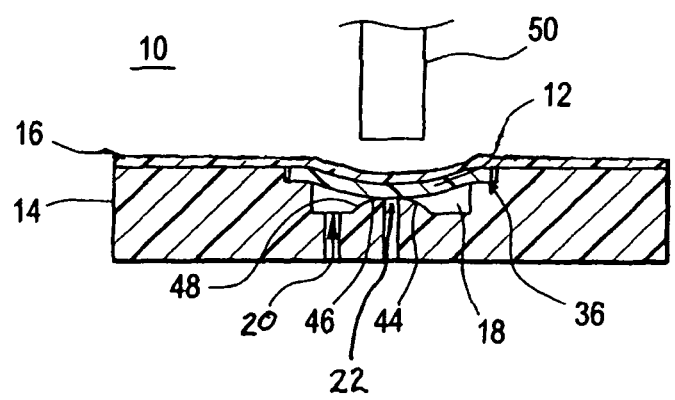
FIG. 4 depicts a cross-sectional view of the microvalve of FIG. 2 in a closed position by action of an external actuator which deflects the valve cover so as to pin the floating gasket in sealing engagement over the valve output port.

As seen in FIG. 4, valve 10 can be operated by a mechanical plunger 50 that presses the membrane 16 towards, and gasket 12 against, valve seat 44. Alternatively, valve cover 16 may be deflected to press gasket 12 onto valve seat 44 by directly applying pressure to the membrane 16 opposite valve recess 18. The present invention contemplates that the direct pressure can be applied through a manifold that is pressed against the top of valve cover 16, where individual manifold chambers apply pressure to an associated microvalve 10 that need to be controlled independently. External actuation of valve membrane 16 allows a simpler and lower cost valve, even allowing the valve to be disposable.

While a particular embodiment of the present invention has been shown and described, it will be obvious to those skilled in the art that changes and modifications may be made without departing from the teaching of the instant invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microvalve assembly comprising:
    a valve body comprising an elongate valve body having opposed first and second major surfaces, said first major surface defining a valve recess and said second major surface defining a first fluid port and a second fluid port, both said first and second fluid ports being in fluid communication with said valve recess;
    a floating gasket freely positioned within said valve recess so as to extend in overlying registry with at least one of said first and second fluid ports;
    a valve cover bonded to said valve body, said valve cover including a first planar surface and positioned in overlying registry with said valve recess so as to enclose said gasket therein, said valve cover being deflectable into said valve recess so as to cause said gasket to seal at least one of said first and second fluid ports.

2. A microvalve assembly of claim 1, wherein said valve body and said valve cover are formed from the same material.

3. A microvalve assembly of claim 1, wherein said valve body is adhesively bonded to said valve cover.

4. A microvalve assembly of claim 1, wherein said floating gasket is made from teflon.

5. A microvalve assembly of claim 1, wherein said valve body is formed from COC.

6. A microvalve assembly of claim 5, wherein said valve cover is formed from COC.

7. A microvalve assembly of claim 1, wherein said floating gasket extends substantially fully across said valve recess.

8. A microvalve assembly of claim 1, wherein said second fluid port is coaxially-aligned with said valve recess.

9. A microvalve assembly of claim 1, wherein said first and second fluid ports open in underlying registry with said floating gasket.

10. A microvalve assembly of claim 1, wherein, said floating gasket has a thickness in the range of 5 micron to 1 millimeter.

11. A microvalve assembly of claim 1, wherein said valve body includes an annular rim spaced from, and in facing opposition to, said first major surface of said valve cover.

12. A microvalve assembly of claim 11, wherein said gasket is loosely pinned between said annular rim and said cover.

13. A microvalve assembly of claim 12, wherein said gasket spans about mid-way across said annular rim.

14. A microvalve assembly of claim 12, wherein said gasket spans substantially across said annular rim.

15. A microvalve assembly of claim 1, wherein said valve body further includes a valve seat formed by an annular surface about said second fluid port.

16. A microvalve assembly of claim 15, wherein said valve seat further comprises a sloping surface extending from said first fluid port to said second fluid port, said sloping surface being non-transversely oriented with the longitudinal axis of said second fluid port.

* * * * *